Jan. 3, 1933.　　　　　D. B. BOLICH　　　　　1,892,745
READING STAND
Filed March 29, 1932　　　5 Sheets-Sheet 1
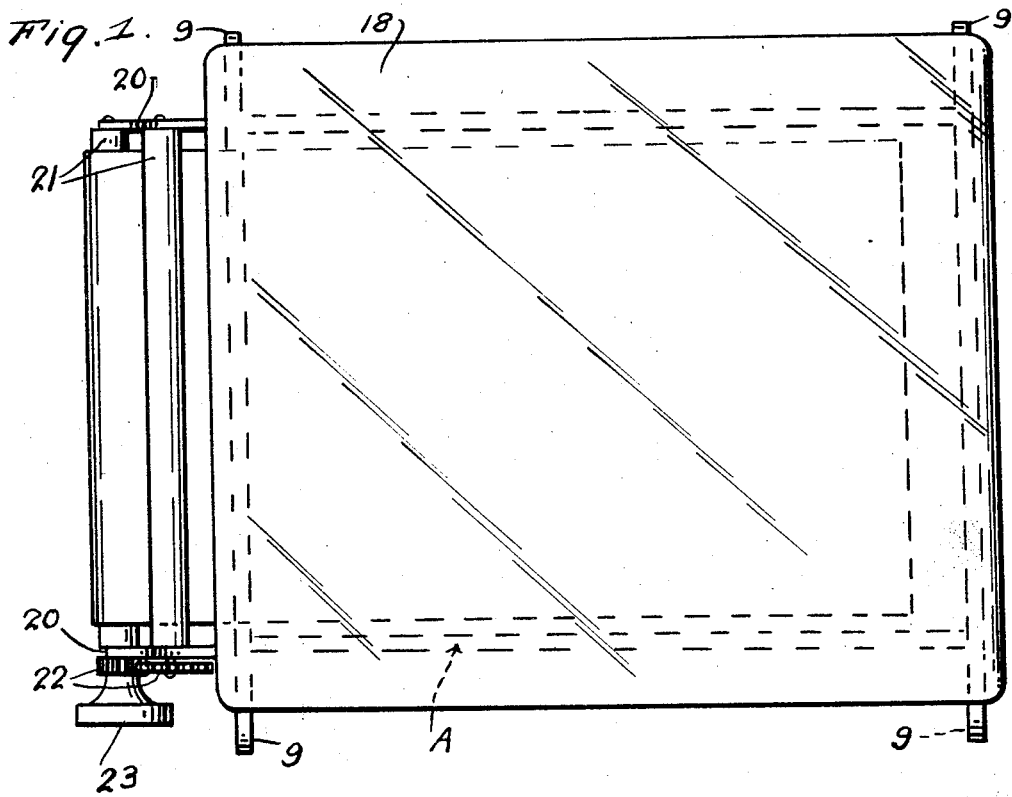
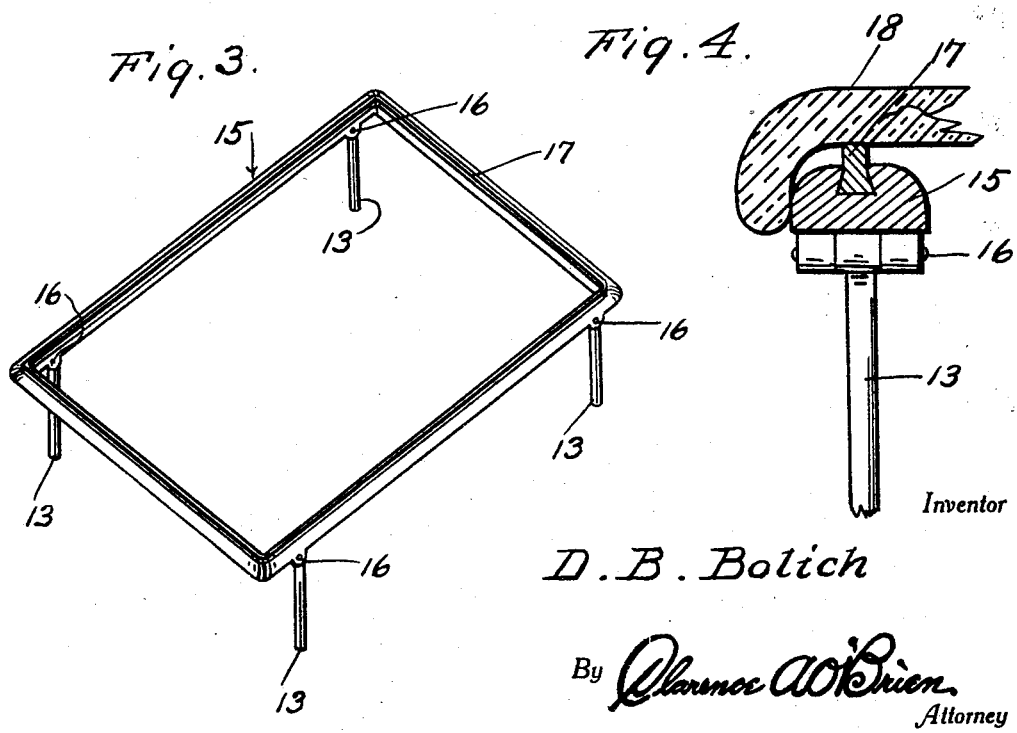
Inventor
D. B. Bolich
By Clarence A. O'Brien
Attorney

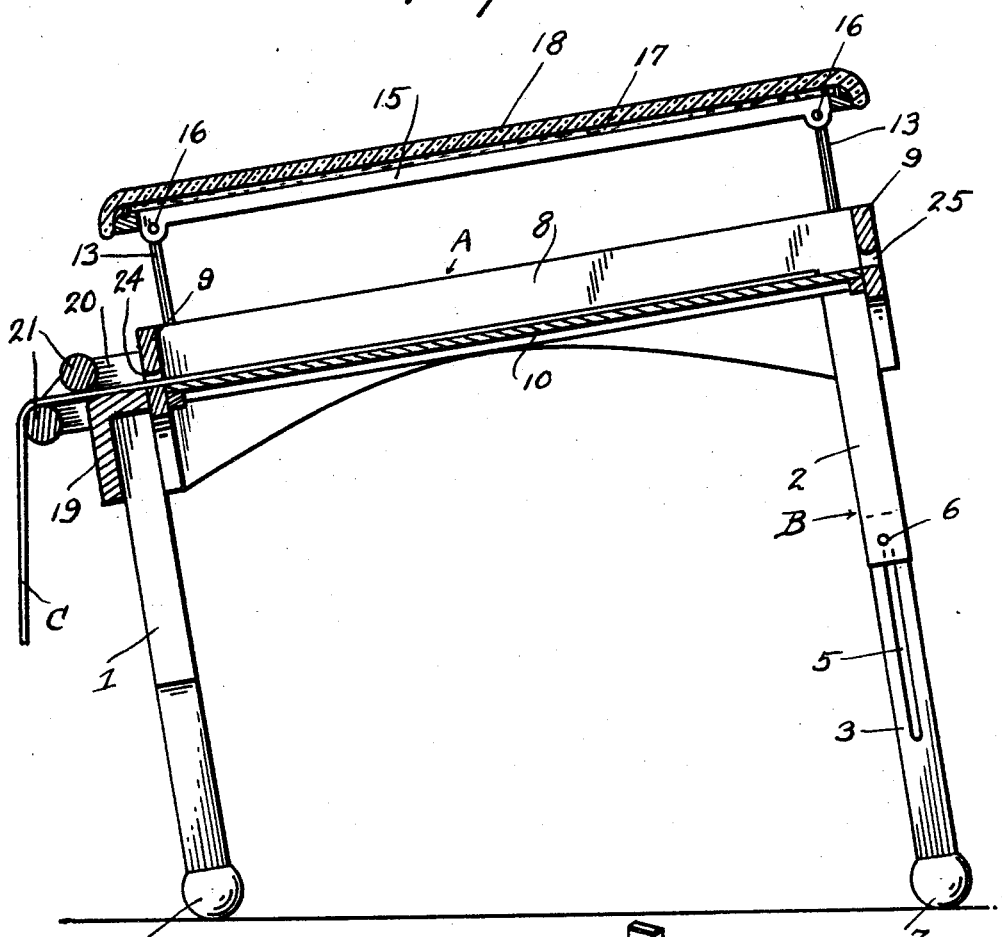
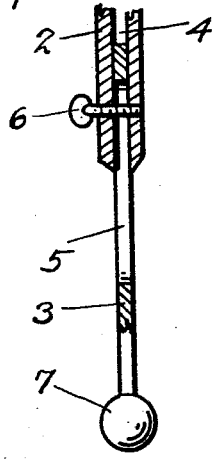
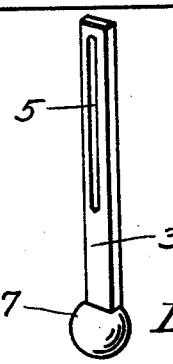

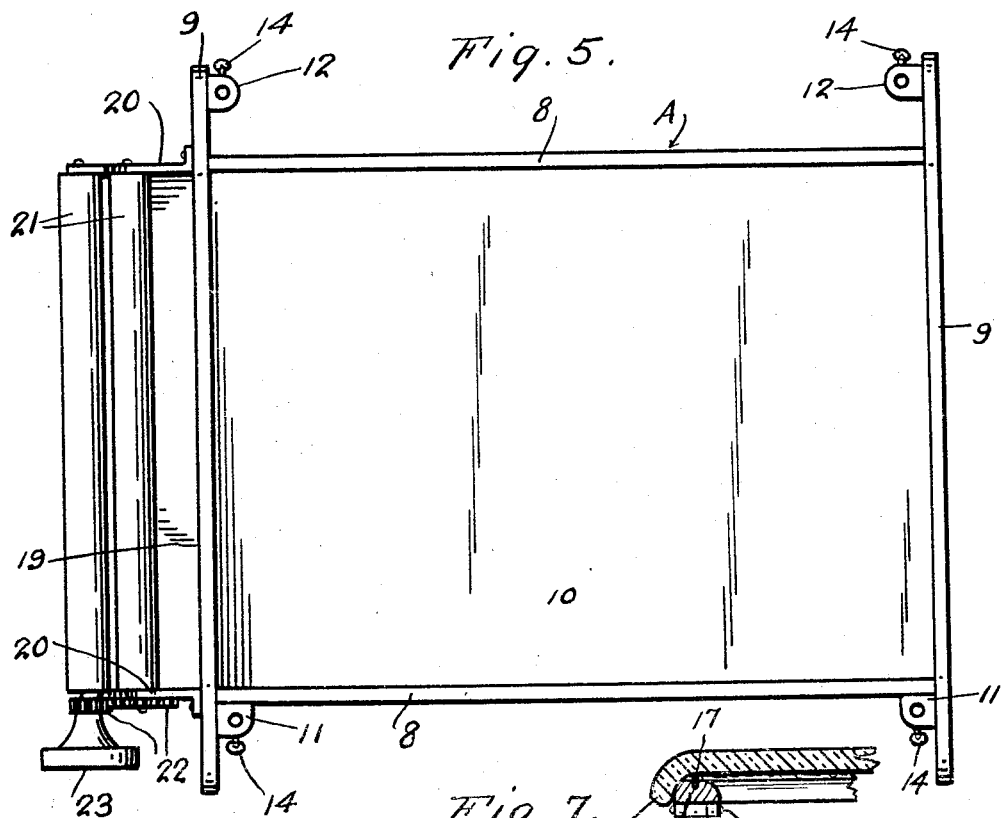
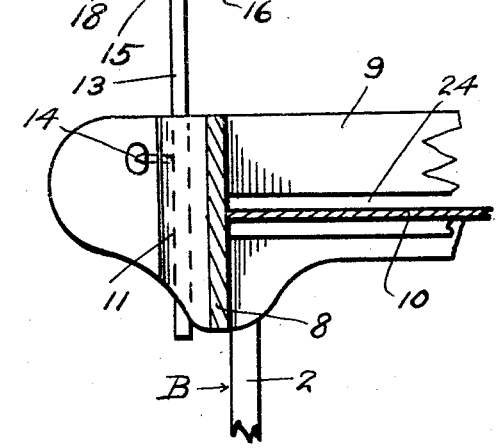
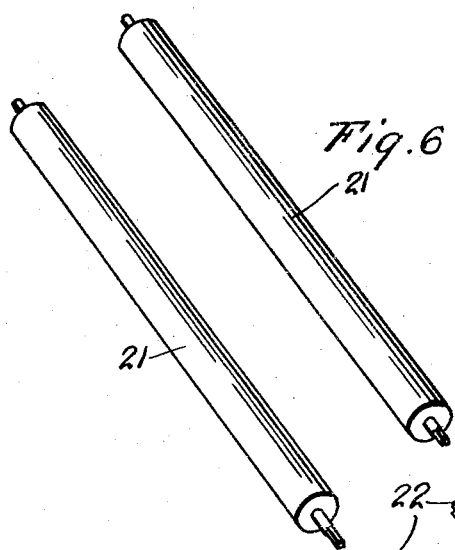
Inventor
D. B. Bolich
By Clarence A. O'Brien
Attorney

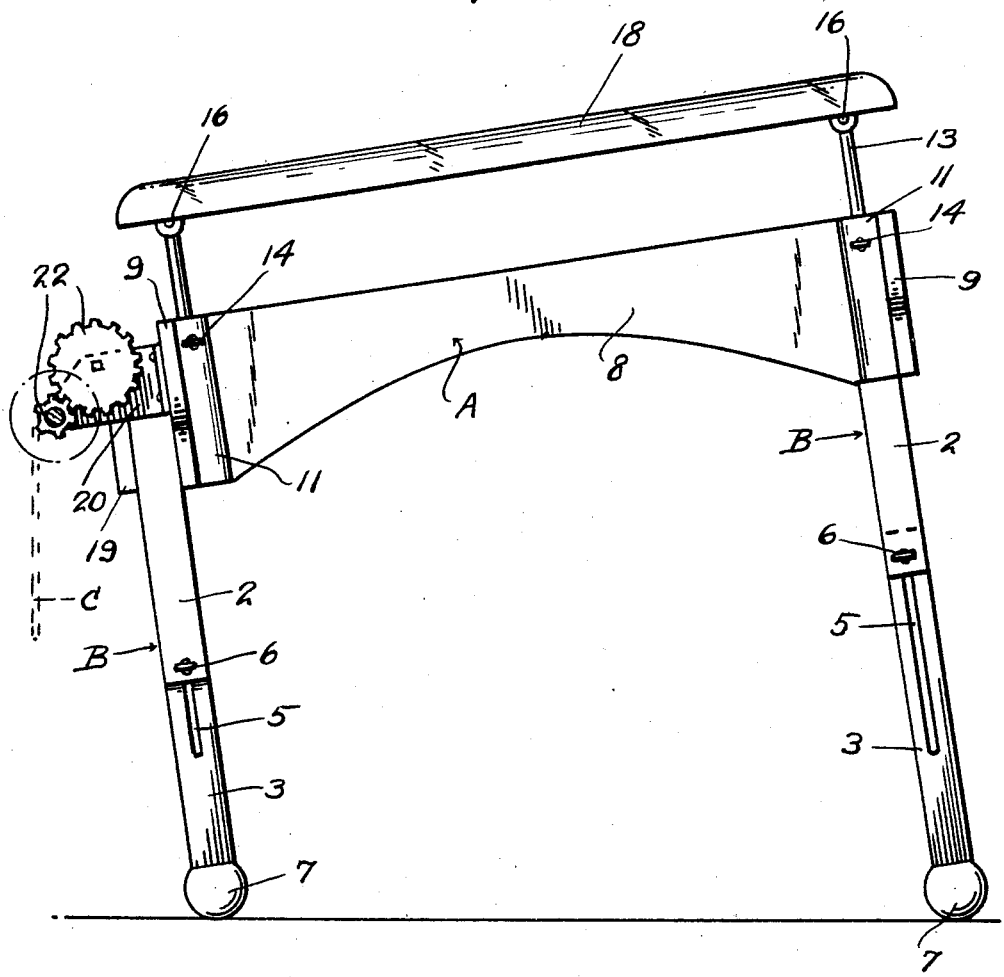
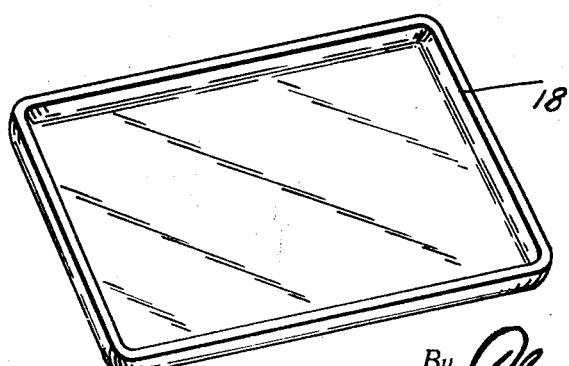

Jan. 3, 1933.  D. B. BOLICH  1,892,745
READING STAND
Filed March 29, 1932  5 Sheets-Sheet 5
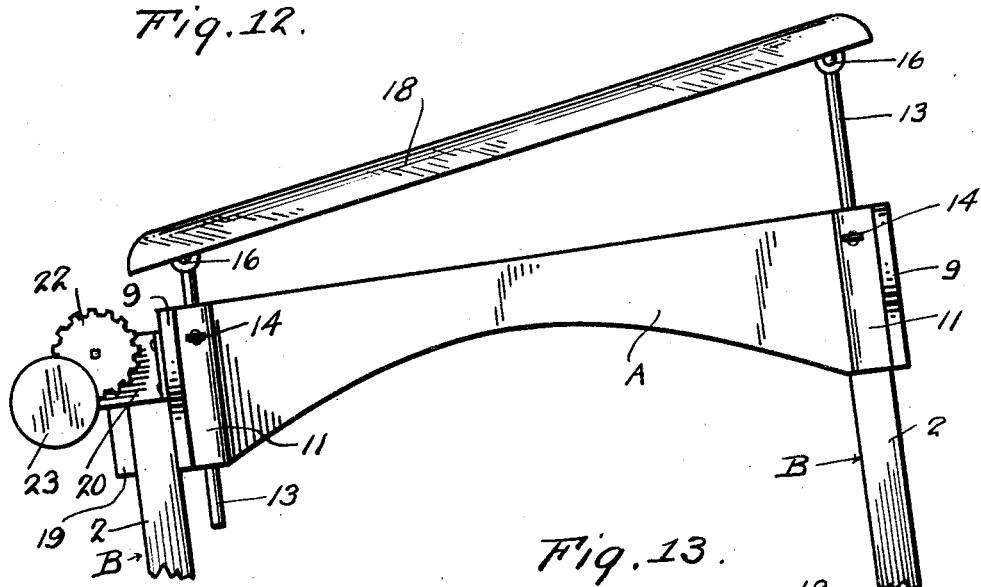
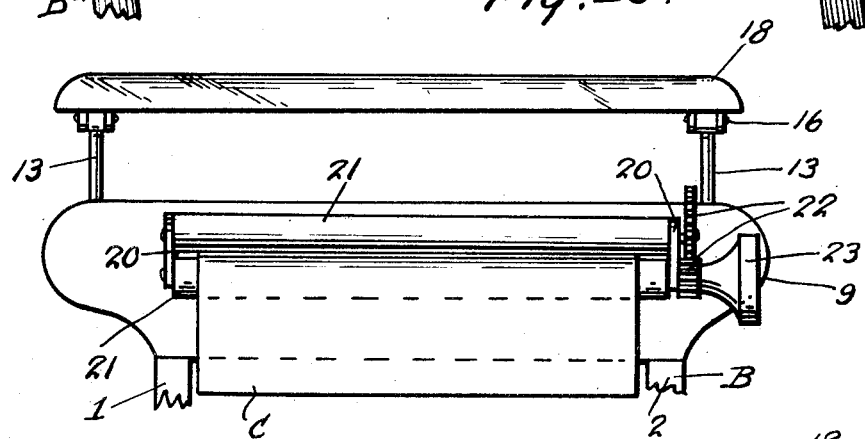
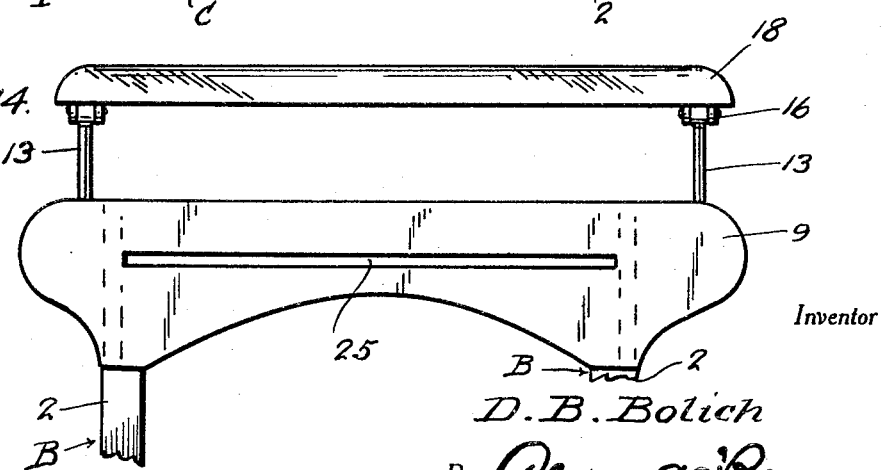
Inventor
D. B. Bolich
By Clarence A. O'Brien
Attorney Patented Jan. 3, 1933

1,892,745

UNITED STATES PATENT OFFICE

DANIEL B. BOLICH, OF SKIDMORE, MISSOURI

READING STAND

Application filed March 29, 1932. Serial No. 601,832.

This invention relates to a reading stand, the general object of the invention being to provide a support for reading matter and the like, with means for adjusting three legs of the support lengthwise so as to permit the support to be adjusted to any desired angle and to provide an adjustable frame for supporting a reading glass or magnifying glass in position over the reading matter on the support, and while the device is mainly intended for use by typists, it will of course be understood that it can be used for other purposes.

Another object of the invention is to provide means for feeding the reading matter across the support or table.

This invention also consists in certain other features of construction and in the combination and arrangement of the several parts to be hereinafter fully described, illustrated in the accompanying drawings and specifically pointed out in the appended claims.

In describing the invention in detail, reference will be had to the accompanying drawings wherein like characters denote like or corresponding parts throughout the several views, and in which:—

Figure 1 is a top plan view of the device.

Fig. 2 is a vertical sectional view therethrough.

Fig. 3 is a perspective view of the glass supporting frame.

Fig. 4 is an enlarged sectional view through a part of the glass, the frame and the strip on which the glass rests.

Fig. 5 is a plan view with the frame removed.

Fig. 6 is a view of the two rollers, the gears, and the knob showing the parts separated.

Fig. 7 is a fragmentary vertical sectional view through a part of the glass, the frame and the main supporting frame.

Fig. 8 is a side view of the entire device with parts in section.

Fig. 9 is a view of the reading glass in inverted position.

Fig. 10 is a fragmentary sectional view through one of the adjustable legs.

Fig. 11 is a view of the lower section of one of the legs.

Fig. 12 is an elevation of the upper part of the device with the reading glass supported in a different position, from that shown in Figs. 2 and 8.

Fig. 13 is a front view.

Fig. 14 is a rear view.

In these drawings, the letter A indicates the main frame which is supported by the four legs, the left front leg 1 being formed of a single member and the other three legs, shown at B are each formed of a stationary upper section 2 and a movable lower section 3 which is slidably arranged in a slot 4 in the upper section 2 and which is formed with an elongated vertically arranged slot 5 through which passes a set screw 6 which when tight holds the lower section 3 in adjusted position. Each of the three legs B, that is the two rear legs, and the right front leg can be adjusted as to its length in order to adjust the inclination, both longitudinally and laterally, if desired, of the stand or table.

Each leg is provided with a substantially spherical member 7 at its lower end which is preferably formed of rubber or the like. The main frame or top A is composed of the side members 8, the end members 9, and the top board 10 which is spaced from the upper edges of the side and end members.

As shown in Fig. 5, the end members project beyond the side members and socketed brackets 11 are placed in the corners formed by the right hand side piece 8 and the projected ends of the end pieces and similar brackets 12 are fastened to the left hand ends of the end pieces and are spaced outwardly from the left hand side piece 8 as shown in Fig. 5.

The sockets of these four brackets are to receive the rods 13 which are held in adjusted position in these brackets by the set screws 14, and a rectangular frame 15 is pivotally connected to the upper ends of the rods 13 as shown at 16. The upper edge of this frame 15 is grooved to receive a strip 17 of rubber or the like which projects above the frame for supporting a reading glass or magnifying glass 18 which is of substantially dishshape as shown in Fig. 9, so that when inverted its flange will fit over the frame 15 and thus the glass will be supported by the frame.

It is to be understood that the distance the glass is spaced from the main frame or table top can be adjusted by adjusting the rods 13 in the sockets of the brackets 11 and 12, and the inclination of the glass can also be adjusted by raising or lowering the rear rod to a greater extent than the front rods. This is shown in Fig. 12, which shows the rear end of the glass raised to a greater distance than its front end.

An extension shown generally at 19 is formed at the front of the main frame or top part and includes the end pieces 20 in which is journalled the upper and lower rollers 21 which are geared together by the gears 22 and a knob 23 is connected to one end of the lower roller 21 so that by turning the knob, both rollers will be rotated so that a sheet or strip C can be fed thru the slot 24 in the front end member onto the top part 10 and this strip will pass through a slot 25 in the rear end piece.

As will be seen the paper or other sheet when placed on the top part 10, will be located under the reading or magnifying glass so that one looking through this glass can readily read the matter on the sheet and by extending the left hand side of the glass supporting frame as shown clearly in Fig. 1, the user can readily see the beginning of the lines on the sheet.

From the foregoing it will be seen that I have provided a simple form of reading stand which can be placed on the desk of a typist or other person and by turning the knob the sheet containing the matter to be copied can easily be read through the magnifying glass and the sheet will be held in place without danger of being blown off the device as it is located within the space formed by the elevated side and end pieces and by passing through the rollers and through the slots.

The top of the device can also be adjusted by the three adjustable legs to the most desirable position for enabling the typist to read the matter on the sheet and the magnifying glass can also be adjusted to suit the vision of the user.

The magnifying glass can be easily and quickly lifted from the device as it is not fastened on in any manner, but it is held in place without danger of it being knocked off by the parts of the glass extending over the supporting frame 15.

It is thought from the foregoing description that the advantages and novel features of the invention will be readily apparent.

It is to be understood that changes may be made in the construction and in the combination and arrangement of the several parts provided that such changes fall within the scope of the appended claims.

Having thus described my invention, what I claim as new is:—

1. A device of the class described comprising a main frame, legs connected therewith, three of the legs being adjustable as to their length the end members of the main frame projecting beyond a side member thereof at one side of the device, sockets carried by the projecting portions of the end pieces, sockets carried by the other side of the main frame, rods passing thru the sockets and adjustably held therein, a rectangular frame pivotally connected at its upper end to the rods, a strip carried by the said frame projecting upwardly beyond the same, a reading glass of inverted dish shape resting on the strip and having its flange engaging the outer edge of the rectangular frame, said end members having slots therein, a top forming portion located between the side and end members and spaced below the upper edges thereof with its top face in alinement with the lower walls of the slots, an extension at the front of the main frame, feeding rollers located therein and geared together, and means for rotating one of the rollers to feed a strip between them and through the front slot upon the top forming portion.

2. A reading device of the class described comprising a table, a frame forming an opening means for supporting the frame above the table top, said means including means for adjusting the frame towards and away from the table top, and a magnifying glass resting on the frame and having its edges extending downwardly for holding the glass on the frame.

3. A reading device of the class described comprising a table for supporting the matter to be read, socketed brackets attached adjacent the four corners of the table, a frame forming an opening, rods pivoted to the four corners of the frame and passing through the sockets of said brackets, means for holding the rods in adjusted position in the bracket, and a magnifying glass resting on the frame and having its edges extending downwardly for holding the glass on the frame.

In testimony whereof I affix my signature.

DANIEL B. BOLICH.